US008423365B2

(12) United States Patent
Ben-Ezri

(10) Patent No.: US 8,423,365 B2
(45) Date of Patent: Apr. 16, 2013

(54) CONTEXTUAL CONVERSION PLATFORM

(76) Inventor: Daniel Ben-Ezri, South Burlington, VT (US)

( * ) Notice: Subject to any disclaimer, the term of this patent is extended or adjusted under 35 U.S.C. 154(b) by 420 days.

(21) Appl. No.: 12/789,576

(22) Filed: May 28, 2010

(65) Prior Publication Data

US 2011/0295606 A1    Dec. 1, 2011

(51) Int. Cl.
*G10L 13/08* (2006.01)
*G10L 13/00* (2006.01)
*G06F 17/21* (2006.01)

(52) U.S. Cl.
USPC ........................... 704/260; 704/258; 704/10

(58) Field of Classification Search .......... 704/258–269, 704/270.1, 275, E13.001–9, 13.01, 13.011–4
See application file for complete search history.

(56) References Cited

U.S. PATENT DOCUMENTS

| | | | |
|---|---|---|---|
| 4,831,654 A | 5/1989 | Dick | |
| 5,555,343 A | 9/1996 | Luther | |
| 5,634,084 A * | 5/1997 | Malsheen et al. | 704/260 |
| 5,640,590 A | 6/1997 | Luther | |
| 5,752,228 A | 5/1998 | Yumura et al. | |
| 5,950,161 A | 9/1999 | Kozuma et al. | |
| 6,115,686 A | 9/2000 | Chung et al. | |
| 6,349,132 B1 * | 2/2002 | Wesemann et al. | 379/88.17 |
| 6,374,223 B1 | 4/2002 | Donaldson et al. | |
| 6,823,311 B2 | 11/2004 | Tetsumoto | |
| 6,865,533 B2 | 3/2005 | Addison et al. | |
| 6,961,704 B1 | 11/2005 | Phillips et al. | |
| 6,985,864 B2 | 1/2006 | Nagao | |
| 6,996,533 B2 | 2/2006 | Ikeda et al. | |
| 7,020,611 B2 | 3/2006 | Gilde et al. | |
| 7,027,568 B1 | 4/2006 | Simpson et al. | |
| 7,058,887 B2 | 6/2006 | Cragun | |
| 7,136,876 B1 * | 11/2006 | Adar et al. | 1/1 |
| 7,231,020 B2 | 6/2007 | Rhie et al. | |
| 7,292,983 B2 | 11/2007 | Yazu | |
| 7,318,033 B2 | 1/2008 | Okutani et al. | |
| 7,415,412 B2 * | 8/2008 | Naoi | 704/260 |
| 7,536,297 B2 * | 5/2009 | Byrd et al. | 704/10 |
| 7,848,918 B2 * | 12/2010 | Li et al. | 704/9 |
| 2001/0032234 A1 * | 10/2001 | Summers et al. | 709/201 |
| 2002/0152064 A1 * | 10/2002 | Dutta et al. | 704/9 |
| 2002/0178007 A1 * | 11/2002 | Slotznick et al. | 704/270.1 |
| 2003/0172353 A1 * | 9/2003 | Cragun | 715/517 |
| 2004/0205614 A1 * | 10/2004 | Keswa | 715/523 |
| 2007/0100619 A1 | 5/2007 | Purho | |
| 2007/0124142 A1 * | 5/2007 | Mukherjee | 704/235 |
| 2007/0283270 A1 | 12/2007 | Sand et al. | |

* cited by examiner

*Primary Examiner* — Jesse Pullias
(74) *Attorney, Agent, or Firm* — Hiscock & Barclay, LLP

(57) ABSTRACT

A contextual conversion platform, and method for converting text-to-speech, are described that can convert content of a target to spoken content. Embodiments of the contextual conversion platform can identify certain contextual characteristics of the content, from which can be generated a spoken content input. This spoken content input can include tokens, e.g., words and abbreviations, to be converted to the spoken content, as well as substitution tokens that are selected from contextual repositories based on the context identified by the contextual conversion platform.

20 Claims, 8 Drawing Sheets

CONTEXTUAL CONVERSION PLATFORM

TECHNICAL FIELD

The present invention is related to text-to-speech technology, and more particularly to a platform and method configured to utilize the context of content in a target to generate spoken content output for use by a text-to-speech engine.

BACKGROUND

Many text-to-speech applications have only limited ability to adapt to the format of a target. This limitation is more pronounced when applied to the vast differentiation of digitized content available via the World Wide Web. For example, in addition to information pertinent to the user for which the page was accessed, Web pages often contain information that is not relevant, especially if spoken. However, because text-to-speech applications are generally configured to recognize and speak each and every syllable present within the content of the target Web page, the spoken output that results from conversion of these Web pages will contain irrelevant speech and is often garbled, unintelligible, or simply incoherent.

It is therefore advantageous to improve the quality of the spoken content resulting from Web pages and other digitized content accessed via browsing technology, wherein such improvements can be realized in terms of spoken content to the end-user that is meaningful, relevant, and desired. It is likewise advantageous that the spoken content is free from irrelevant information that may be present within the information of the Web pages.

SUMMARY

There is provided below a platform and method for generating an input based on the content of the target. As discussed in more detail below, embodiments of the platform are configured to identify the format and characteristics of the target and, in conjunction with the context and organization of the content of the target, can generate an input for use by the text-to-speech engines that improves the resulting spoken content by way of clarity, enunciation, and other factors pertinent to the end user.

In one embodiment, a contextual conversion platform is provided for implementation on a computing device to process content of a target for use with a text-to-speech engine. The contextual conversion platform comprising a processing module for generating a spoken content input in response to the target. The processing module comprising a first filter module for identifying a context identifier in the target, and a second filter module for delineating portions of the target comprising one or more target terms. The contextual conversion platform also comprising a repository in communication with the processing module, the repository having entries that are organized according to a prioritized scheme, the entries comprising an identified unit respecting the target terms in the delineated portion and a replacement unit corresponding to the identified unit. The contextual conversion platform further defined wherein the priority scheme assigns a position for the identified unit amongst a plurality of tables in the repository, wherein the position is associated with a specificity characteristic that defines a level of priority for identified unit, wherein the level of priority changes as between the tables, and wherein the processing module replaces the identified unit in the delineated portion with the replacement unit in accordance with the level of priority to form the spoken content input.

In another embodiment, a computer-implemented method is provided for converting content of a target for use with a text-to-speech engine. The method comprising a step for identifying a context identifier from among the content of the target, a step for separating the content into relevant content and miscellaneous content, and a step for locating a target term in the relevant content. The method also comprising a step for using the context identifier to identify a substitution unit for the target term, and a step for generating a spoken content input comprising a replacement unit corresponding to the substitution unit. The method further defined wherein the substitution unit is selected from a repository with entries that are arranged in tables in accordance with a priority scheme, wherein the priority scheme defines a position amongst the tables for the substitution unit, and wherein the position is associated with a specificity characteristic that defines the level of priority for the identified token.

BRIEF DESCRIPTION OF THE DRAWINGS

So that the manner in which the above recited features of the present invention can be understood in detail, a more particular description of the invention briefly summarized above, may be had by reference to the figures, some of which are illustrated and described in the accompanying appendix. It is to be noted, however, that the appended documents illustrate only typical embodiments of this invention and are therefore not to be considered limiting of its scope, for the invention may admit to other equally effective embodiments. Moreover, the drawings are not necessarily to scale, with emphasis generally being placed upon illustrating the principles of certain embodiments of invention.

Thus, for further understanding of the nature and objects of the invention, references can be made to the following detailed description, read in connection with the specification following below in which.

DETAILED DESCRIPTION

Figure 1:
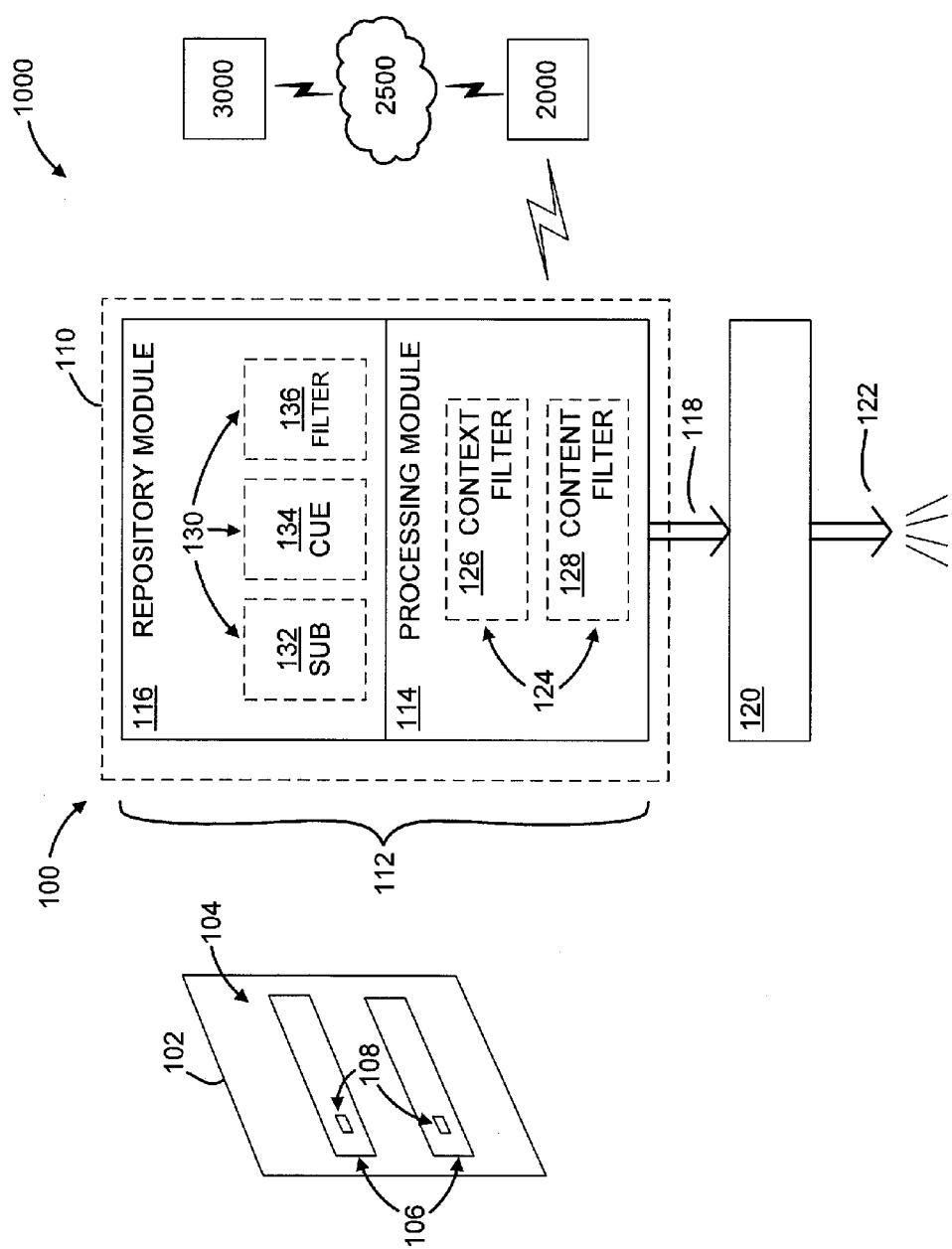
FIG. 1 is a schematic diagram of an exemplary embodiment of a contextual conversion platform.

Illustrated in the appended drawings and discussed herein are embodiments of a contextual conversion platform and method of converting text to an input suitable for use as an input to text-to-speech engines. Broadly stated, these embodiments can be configured to generate the input to the text-to-speech engine from the content of a target (e.g., a Web-based document) so that the spoken output of the textto-speech engine is accurate, audible, and clearly enunciated. There is provided below, for example, embodiments in which the contextual conversion platform is configured to ascertain the particular usage of pieces of the content by way of the context in which the text and/or combinations of the text are presented in the content.

Context as this label is used herein can refer in one aspect to the usage, meaning, and/or relationship of these pieces of content relative to the other pieces of the content found in the target. This context-based approach is particularly beneficial because it facilitates accurate text-to-speech conversion in a platform technology, which can be used in connection with a variety of targets such as targets with content embodied as Web-based content (e.g., Web pages) as well as other targets and/or content in digital and digitized formats. Moreover, whereas this platform technology is readily applicable to a wide range of digitized content, it is further contemplated that embodiments of the contextual conversion platform and method can be applied to other applications, including software, hardware, and device-level applications, which are adapted for generating spoken content from the input described herein. Exemplary applications can include, but are not limited to, voice-based browser technology, voice-based printer drivers, as well as other voice-based technology and devices.

For purposes of clarifying the discussion that follows, labels used hereinafter have the meaning ascribed below:

A "character(s)" comprises letters, numbers, spaces, punctuation, and other symbols that represent and are used to formulate content such as written and spoken speech;

A "target term(s)" comprises one or more "characters" combined to form, for example, words and abbreviations, as well as symbols and graphics, and combinations and derivations thereof, to be the core substituted element as will be described later in this document;

A "token(s)" comprises a "target term" or variants that comprise a "target term" and one or more "neighboring characters," which are "characters" proximate the "target term";

A "regular expression(s)" comprises one or more "tokens", wherein the regular expressions comprises characters configured to match target terms, tokens, and other content of the target;

A "substitution unit(s)" comprises a "token" or a "regular expression" (containing tokens, as defined above), and is a synonym for the syntax of the regular expressions defined above and in the context of this document.

In view of the foregoing, utilizing context as a basis for generating the input to the text-to-speech engine is useful because targets may include content with target terms, which although similar in appearance, can have vastly different spoken characteristics including meaning, intonation, and pronunciation. Such spoken characteristics may be based, in whole or in part, on the construction of the target terms, on the relationship of the target terms with neighboring characters within the content, on the type of content in the target, and even on the type of target itself. Concepts of the type described herein can accommodate for these variations, thereby configuring the input with the correct spoken characteristics for each target term. Processing of this input by the text-to-speech engine can generate an output (e.g., spoken content) that can be substantially free from the spoken errors that would normally result without implementation of concepts that utilize the contextual understanding of the target terms within the original content of the target.

By way of example, but not limitation, embodiments of the contextual conversion platform and method can be implemented in connection with various Web pages such as those in which driving directions are presented to a user. These driving directions often include target terms such as abbreviations that can have multiple pronunciations. The target term "st", for example, may occur in multiple locations within the driving directions, but with each particular occurrence of the target term "st" having different spoken characteristics. In one occurrence, the target term "st" may be used in a manner consistent with the pronunciation of the word "STREET". In another occurrence, the target term "st" may be used in a manner consistent with the pronunciation of the word "SAINT". Each of these pronunciations may have different spoken characteristics, and any one or more may occur within the same sentence, combination of sentences, or content of the target as a whole.

Driving directions may also include target terms wherein the target terms can have multiple uses such as one use as an abbreviation and one use as part of a word. Each particular use can in turn have a set of spoken characteristics that are different than the other uses. In one example, the target term "ter" can be used to abbreviate the word "TERRACE", wherein the pronunciation of the target term "ter" is akin to the pronunciation of the word "bear." The target term "ter" can also be used as part of other words such as the word "CENTER", in which case there should be no substitution. As will discussed in more detail below, the input generated by context-based approaches of type utilized by embodiments of the contextual conversion platform and method can have the correct pronunciation for each of the various uses, e.g., by utilizing the context for each occurrence of the target term "st" and the target term "ter".

In one embodiment, the selection of the correct pronunciation of target terms such as "st" and "ter" can be assisted by neighboring characters that appear in and around the target term. In one example, the concepts of which are discussed in more detail below, combinations of the target term "st" and neighboring characters, which include combinations such as 'on st', '-st-', 'st-', st ', st(', and 'st,', can be used to identify the correct substitution for each occurrence of the target term "st" in the content of the target. Likewise in another example, when neighboring characters are not available, feasible, helpful, or reverse in their specificity role such as in the occurrence of the target term "ter" in "CENTER", implementation of the contextual conversion platform can use other combinations in which the target term is combined with other characters such as to reverse the creation of "CENTERRACE" by implementing another priority table.

Each of these combinations can be stored as substitution units in a repository, and in one embodiment a priority scheme is used to assign the position of the substitution unit in the repository. In one example, the priority scheme can be used to assign the position of each substitution unit in one or more tables, wherein the position is based on a specificity characteristic particular to each individual substitution unit. The resulting tables can be used to perform prioritized substitution in which target terms identified in the content of the target are associated with the substitution units, and more particularly are associated with one or more regular expressions and/or tokens. The associated substitution unit can be used to insert a replacement (e.g., a replacement token) in the input in place of the target term.

Figure 2:
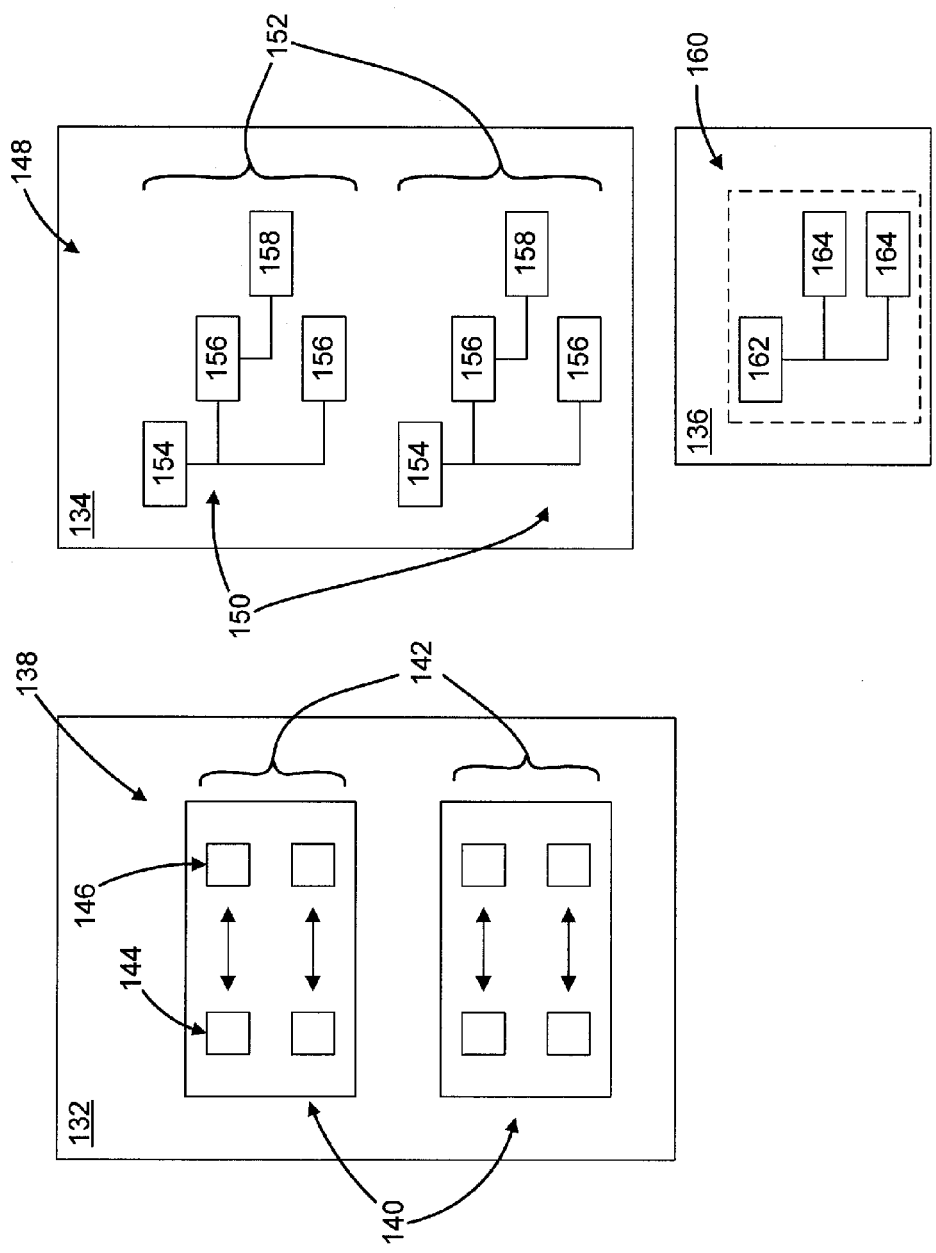
FIG. 2 is a schematic diagram of a content repository for use with a contextual conversion platform, such as the contextual conversion platform of FIG. 1

To further exemplify these concepts of contextual conversion platforms of the present disclosure reference can now be had to the schematic representations illustrated in FIGS. 1 and 2. There is depicted in FIG. 1 an exemplary embodiment of a contextual conversion platform 100, which is configured to interact with a target 102 that has content 104 disposed thereon. In the present example, the content 104 can include contextual units 106 constructed of target terms 108 such as, for example, words, abbreviations, characters, symbols, and graphics (e.g., images).

The contextual conversion platform 100 can include a platform structure 110 with modules 112 such as a processing module 114 and a repository module 116. These modules 112 can be configured to generate a spoken content input 118, which can be utilized by a speech generating module 120 for generating a spoken output 122. The processing module 114 can include one or more filters 124 such as a context filter 126 and a content filter 128. The processing module 114 can communicate with the repository module 116 such as by interacting with one or more context repositories 130 such as databases, spreadsheets, tables, and the like. In one embodiment, the contextual conversion platform 100 can include one or more substitution repositories 132, cue determination repositories 134, and filtering repositories 136.

The platform structure 110, including one or more of the modules 112, can be implemented as one or more executable instructions (e.g., software instructions and/or firmware instructions) which can be implemented as part of and/or wholly incorporated into various other executable instructions for use on, e.g., a computing device such as a PC, laptop, smartphone, PDA and the like. This computing device can be part of a system 1000 having a local server 2000, a remote server 3000, and a network 2500 that couples the local server 2000 and the remote server 3000. Portions of the system 1000 can be included as part of a grid, cloud, or similar computing network in which resources are shared between and amongst a variety of computing devices, server devices (e.g., local server 2000 and remote server 3000), and the like.

The configuration of the system 1000 can be utilized for processing the content 104, forming the spoken content input 118, and in one example generating the spoken output 122. In one configuration one or more of the local server 2000 and the remote server 3000 is utilized to entirely process the content 104 in a manner consistent with the disclosure below. In one embodiment, executable instructions related to one or more of the processing module 114, the repository module 116, and the speech generating module 120 can be located outside of the computing device so as to permit data and information such as the content 104 to be transferred from the computing device to, e.g., the local server 2000 and/or remote server 3000, for immediate and/or further processing of the content 104. In another embodiment, processing steps and methodologies disclosed, described, and contemplated herein can be distributed throughout the system 1000 such as between and amongst the computing device, the local server 2000, the remote server 3000, as well as the rest of the system, grid network, and/or cloud computing network, with still other embodiments being configured for the processing steps to be executed entirely by the computing device. Having the processing steps executed exclusively on the computing device can significantly reduce bandwidth required by transferring text rather than audio files. Moreover, this processing can reduce delay from the moment the user chooses an audio versions of a Web site until the audio version is ready to use in the user's (mobile or stationary) computing device.

The speech generating module 120 can be configured to generate the spoken output 122 such as by synthesizing speech from the spoken content input 118. This functionality can be implemented by way of commercially available applications including software and hardware that can provide voice emulation (commonly known as speech synthesis) and other features that can convert the spoken content input 118 to the spoken output 122 with a data format compatible with devices for transmitting, receiving, and/or storing data consistent with human speech. These data formats can include .WAV, .MP3, .WMA, .OGG, .AIFF, and .FLAC, among many others. Examples of suitable applications such as for the speech generating module 120 can include various text-to-speech engines such as SAPI4- and SAPI5-based speech systems and Speech Server from Microsoft; Plaintalk and VoiceOver from Apple; Android Text-To-Speech from Google; as well as various other applications (e.g., software applications and plug-ins) that are compatible with the concepts of the contextual translation platforms and methods contemplated herein.

The processing module 114 can be configured to communicate with the speech generating module 120 and the repository module 116. In one example, the processing module 114 can extract information from the context repositories 130. The processing module 114 can use the extracted information to construct the spoken content input 118, which is passed to the speech generating module 120 and converted into the spoken output 122.

The context filter 126 and the content filter 128 can be configured to identify characteristics of the target 102 to facilitate the construction of the spoken output 122. The context filter 126 can be used, for example, to identify the context of the target 102 such as by determining the originating Web site for the target 102. The content filter 128 can be used to identify the contextual units 106 from within the content 104 of the target 102. Implementation of the various filters, including the context filter 126 and the content filter 128 can be done using various algorithms and methodologies, including the methodologies discussed in connection with the methods of FIGS. 5 and 6 below.

The repository module 116 can include data that is used by the processing module 114 to formulate the spoken content input 118. This data and the repository module 116 in general can be modularized in a manner that permits the context repositories 130 to be updated, modified, prioritized, and otherwise manipulated as desired. In one aspect, embodiments of the contextual conversion platform 100 are configured to permit this modularization, thus creating such scalable platform technology that is compatible with many different digitized documents and document types. Improvements and modifications to the contextual conversion platform 100 can be implemented so as to expand the breadth of material and information for which the spoken content input 118 can be generated by the contextual conversion platform 100.

In one example, manipulation of the various modules of the contextual conversion platform 100 including the context repositories 130 can be implemented in response to changes in the target 102 such as between Web-based content that corresponds to different uniform resource locators ("URL") used as location designators on the World Wide Web. The manipulation of the context repositories 130 can also be implemented as part of one or more modifications to the platform structure 110 in response to, e.g., changes in the type, scope, and/or the content 104 of the target 102. These modifications can be made, for example, to implement the contextual conversion platform 100 for use in conversion to spoken content of electronic messages, various document formats (e.g., Word and pdf), and various Web-based and Web page document types (e.g., newspapers, journals, periodicals, and financial documents), and the like. Manipulation of the context repositories 130 can likewise be implemented as part of one or more modifications to the speech generating module 120 utilized by a given computing device (e.g., updates to Windows versions, plug-in voices by third-parties, differences between mobile and stationary text-to-speech engines, etc.).

Referring now to FIG. 2, and also to FIG. 1, examples of the context repositories 130 for use in the contextual conversion platform 100 are illustrated. As depicted in FIG. 2, the substitution repositories 132 can include a tabulated structure 138 that can include one or more multi-phase tables 140. The multi-phase tables 140 can include one or more substitution units 142, which can include identified units 144 and replacement units 146. The substitution units 142 can include tokens and regular expressions, each of which can correspond to the contextual units 106 and/or the target terms 108 that are found in the content 104.

The cue determination repository 134 can include an identification structure 148 with one or more cue tables 150 that are configured with data that is useful to identify the target 102. This data can include data about the Web site and/or Web page such as URL data, as well as other information particular to the target and that can be used to associate the target with its originator. The cue tables 150 can include a plurality of content identifiers 152 including a primary content identifier 154, a secondary content identifier 156, and a tertiary content identifier 158. The filtering repository 136 can include a filtering table 160 with filtering identifiers 162 and one or more filtering units 164, which can correspond in one example to one or more of the filtering identifiers 162.

As mentioned above, data in the filtering repository 136 can include data typically found within the content 104 of the target 102. This data can include recurring text such as keywords, as well as symbols and other identifiers that are embedded within the data that represents, e.g., the content 104 of a Web page. In one embodiment, these identifiers can be stored in memory as filtering units 164, and organized according to the filtering identifiers 162 that are selected to associate those identifiers with one or more targets 102, and in one particular example the targets 102 are unique from each other. The identifiers that are selected for the filtering units 164 may delineate from other portions of the content 104 the contextual units 106 that will be recognized by the contextual conversion platform 100 and converted for use in the spoken content input 118. By way of example, keywords such as "START" and "FINISH" can be found in the data of Yahoo! driving directions. These keywords can be stored as one or more filtering units 164 and identified by the filtering identifiers 162 selected for Yahoo! driving directions. Recognition of the "START" and the "FINISH" keywords can, in one example, prompt the processing module 114 to remove from consideration certain portions of the content 104. In another example, the keywords may include a phrase such as "driving directions to" or other combination of characters that can be used to identify relevant portions of the content 104 that are converted into the spoken content input 118. Moreover, in yet another example, other factors such as the position, location, relative distance, and the like can be used to derive, e.g., the start of these relevant portions of the content 104.

In one embodiment, the cue determination repository 134, and in particular the cue tables 150 can utilize a "one-to-many" organization that is useful to identify the context of the content 104. This organization can form hierarchical structures, which can be used so that the content identifiers 152 are organized by way of narrowing definition of the context from, e.g., the primary content identifier 154 to the secondary content identifier 156 to the tertiary content identifier 158. When used for purposes of contextual conversion of Web-based content, for example, the primary content identifier 154 for each of the cue tables 146 may uniquely identify the originator of the Web site such as Yahoo!, Google, and MSN, among others. Further narrowing of the cue tables 150 may occur by way of the hierarchical structure, such as where the secondary content identifier 156 may identify the type of Web-based content for each originator (e.g., maps, driving direction, email, etc) and where the tertiary content identifier 158 may identify with particularity the structure of the Web-based content (e.g., flash and/or printed text). Although a three level hierarchical structure is used in the present example, other embodiments may include more or less of the identifiers 148 as desired. Moreover, the cue determination repository 134 can be configured so that additional ones of the identifiers 148 can be added and manipulated (e.g., by adding or changing data) to accommodate varying ones of the target 102.

The substitution repositories 132 can be configured so that the multi-phased tables 140 include tokens and regular expressions that are used by the processing module 114 to formulate the spoken content input 118. These tokens and regular expressions can be stored as the substitution units 142. In one embodiment, tokens and/or regular expressions consistent with one or more pieces of the data received by the processing module 114 are stored as the identified units 144 and a corresponding token or regular expression for each of the data can be stored as the replacement unit 146.

Each of the multi-phased tables 140 can be generated manually such as by creating exemplary ones of the multi-phased tables 140 and populating each with data relevant to the identified units 144 and the replacement units 146. This data can include tokens and regular expressions that correspond to the target terms in the content of the target. The other tables (e.g., the cue tables 150 and the filtering tables 160) can likewise be populated manually. In another embodiment, the contextual conversion platform 100 can also implement systems, instructions, and applications that can automatically generate data and populate the tables (e.g., tables 136, 146, and 156) as well as the various repositories (e.g., the substitution repositories 132, the cue determination repository 134, and the filtering repository 136). Whether generated via manual or automated techniques, the substitution units can be selected based on the target 102 such as based on the content 104 that is expected to be converted using the contextual conversion platform 100.

Substitution units of the type found in the multi-phased tables 140 can include the target terms discussed above, and in one particular example of the multi-phased tables 140 the substitution units correspond to the target terms 108, and variants thereof, that are associated with the content 104 (e.g., driving direction) of the target 102. By way of example, there is depicted in Tables 1-3 below a variety of substitution units that can be found in driving directions generated by Yahoo!. As is illustrated below, these substitution units can comprise tokens and regular expressions that are stored as the identified units, and can include not only the target term (e.g., "st" and "ter"), but also one or more neighboring characters that are proximate the target term. These neighboring characters can define the context of the target term as the target term is used in the content of the target. Included in the tables below, for example, is the abbreviation "st" as well as corresponding variants of the term "st" (e.g., '-st-', 'st-', 'on st', etc.) that might be found in and among the subject driving directions. The substitution units can also comprise corresponding tokens and regular expressions that are stored as replacement units, which can be substituted for the target term when correlated to the identified unit. These replacement units can be used to generate the spoken content input 118. Noted is that single quotations (') are used in the Tables 1-3 below for purposes of illustrating the boundaries of each token such as where spaces are included as one or more of the characters of the token. Such opening and closing single quotations are not necessarily part of the tokens and the regular expressions provided below.

TABLE 1

| Identified Unit | Replacement Unit |
|---|---|
| '-st-' | '-Saint-' |
| 'st-' | 'Saint-' |
| 'on st' | 'on saint-' |
| 'ter' | 'terrace' |
| 'pk so' | 'Park South' |
| 'boul' | 'boulevard' |
| 'boul.' | 'boulevard' |
| '/boul.' | '/boulevard' |
| ', al' | ', Alabama' |
| ', ak' | ', alaska' |

TABLE 2

| Identified Unit | Replacement Unit |
|---|---|
| '0.0' | '0' |
| 'aut' | 'auto route' |
| 'st' | 'street' |
| 'st(' | 'street (' |
| 'st,' | 'street' |
| '- go' | '.-go' |
| 'mi' | 'mile' |
| 'pk' | 'park' |
| 'centerrace' | 'center' |

TABLE 3

| Identified Unit | Replacement Unit |
|---|---|
| (^.*)([a-z][a-z]+terrace )(.*$) | (^.*)([a-z][a-z]+ter )(.*$) |

Regular expressions such as the regular expression found in Table 3 above can be maintained in separate tables or interleaved with the other terms in the table to create functional priority during substitution of the tokens. Regular expressions can be useful for reducing the size of the tables. For example, and with reference to Table 1 above, 'ter' could be replaced with one or more regular expressions (e.g., '(.*.ter)(.*$)') that would associate occurrences of 'ter' with, for example, words that end with 'ter' (e.g., potter, shelter, etc.). The use of regular expressions reduces the listing of entries in the tables, wherein a single regular expression entry could cover all possible variants and variations of a particular target term.

Implementation of the multi-phase tables 140 (e.g., Tables 1-3) can utilize a prioritized scheme, which defines a position of each of the substitution units such as the table to which the substitution units are assigned. Positions of the substitution units inside the assigned table may not be relevant, but rather the position of the substitution units with respect to the other tables may be used to implement the priority scheme. Likewise the order in which the substitution units are substituted can depend on the organization of the substitution units between the tables, as determined by the organization of the tables among the various multi-phase tables 140. In one embodiment, substitution units are assigned to the tables based on a specificity characteristic, which describes the relative inclusivity of the substitution unit as compared with other substitution units in the tables. The most specific substitution units, or least inclusive substitution units, may be substituted earlier during processing of the content of the target. These substitution units may appear in the first table (e.g., Table 1) that is accessed during processing of the content of the target. Less specific, or more inclusive substitution units, may be substituted later during the processing of the content of the target. These substitution units may appear in subsequent tables (e.g., Tables 2 or 3). Using the Tables 1-3 as an example, substitution units in Table 1 can be more specific that the substitution units in Table 2, which can be more specific that the substitution units that are found in Table 3.

Specificity and priority in connection with the prioritized scheme can be used to effectively categorize the target terms 108 that are found in the content 104. Target terms that are apt to be converted incorrectly, that are most generic, or that may be confused with other similar target terms and characters during generation of the spoken content input 118, may be assigned a specificity characteristic that indicates a lower priority in the prioritized scheme. These lowest priority tokens can then be substituted last, such as would occur during processing wherein the processing module 114 accesses the tables of the multiphase tables 140 from highest to lowest priority. Easier and more direct target terms, target terms that are less apt to be converted incorrectly, and target terms wherein the variants identified by the substitution units are less inclusive can be assigned a specificity characteristic that indicates a higher priority in the prioritized scheme, wherein these higher priority substitution units are identified and substituted prior to those substitution units in lower priority tables during processing.

Discussing one implementation that utilizes tables such as the Tables 1-3 above, in one embodiment the processing module 114 will receive target 102 wherein the content 104 is in a text-only form. This text-only form can be in one example rendered by a web browser into an operating system's clipboard. The processing module 114 can apply the context filter 126 and/or the content filter 128 to identify the context of the target 102 and to delineate the contextual units 106 from among the content 104. In connection with the multi-phase tables 140, such as the Tables 1-3, the processing module 114 can access the highest priority table such as Table 1 above, examine the contextual units 106 to locate one or more of the identified units in the Table 1, and substitute the corresponding replacement unit for each of the identified units that occur in the contextual units 106. The processing module 114 can subsequently access the next priority table such as Table 2 above, examine the contextual units 106 (now including the previously substituted replacement units from Table 1) to locate one or more of the identified units in Table 2, and substitute the corresponding replacement unit for each of the identified units that occur in the contextual units 106. The processing module 114 can thereafter access next priority table such as Table 3 above, examine the contextual units 106 (now including the previously substituted replacement units from Tables 1 and 2) to locate one or more of the identified units in Table 3, and substitute the corresponding replacement unit for each of the identified units that occur in the contextual units 106.

Figure 3:
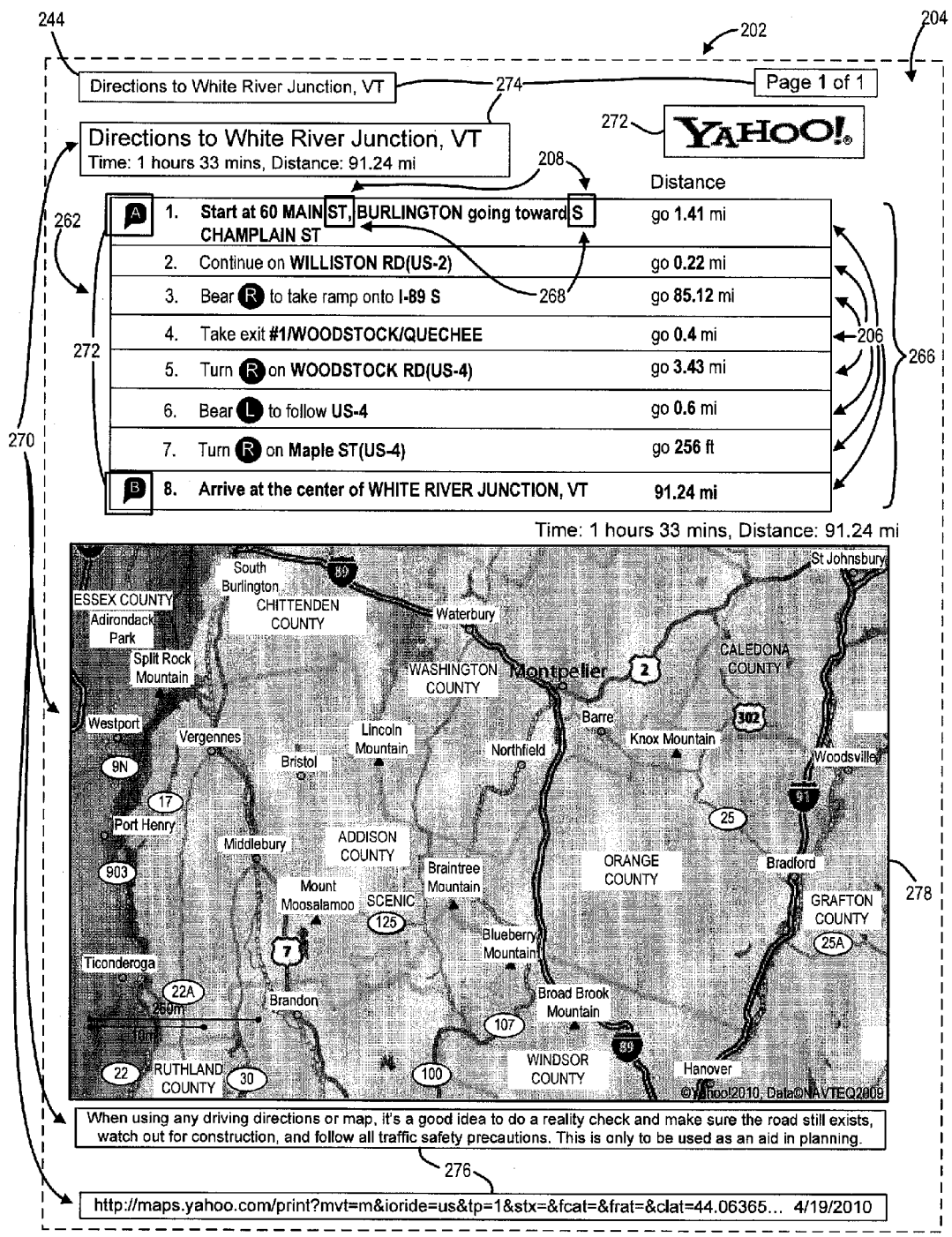
FIG. 3 is an illustration of a target in a Web-base format for use with a contextual conversion platform such as the contextual conversion platform of FIG. 1.
Figure 4:
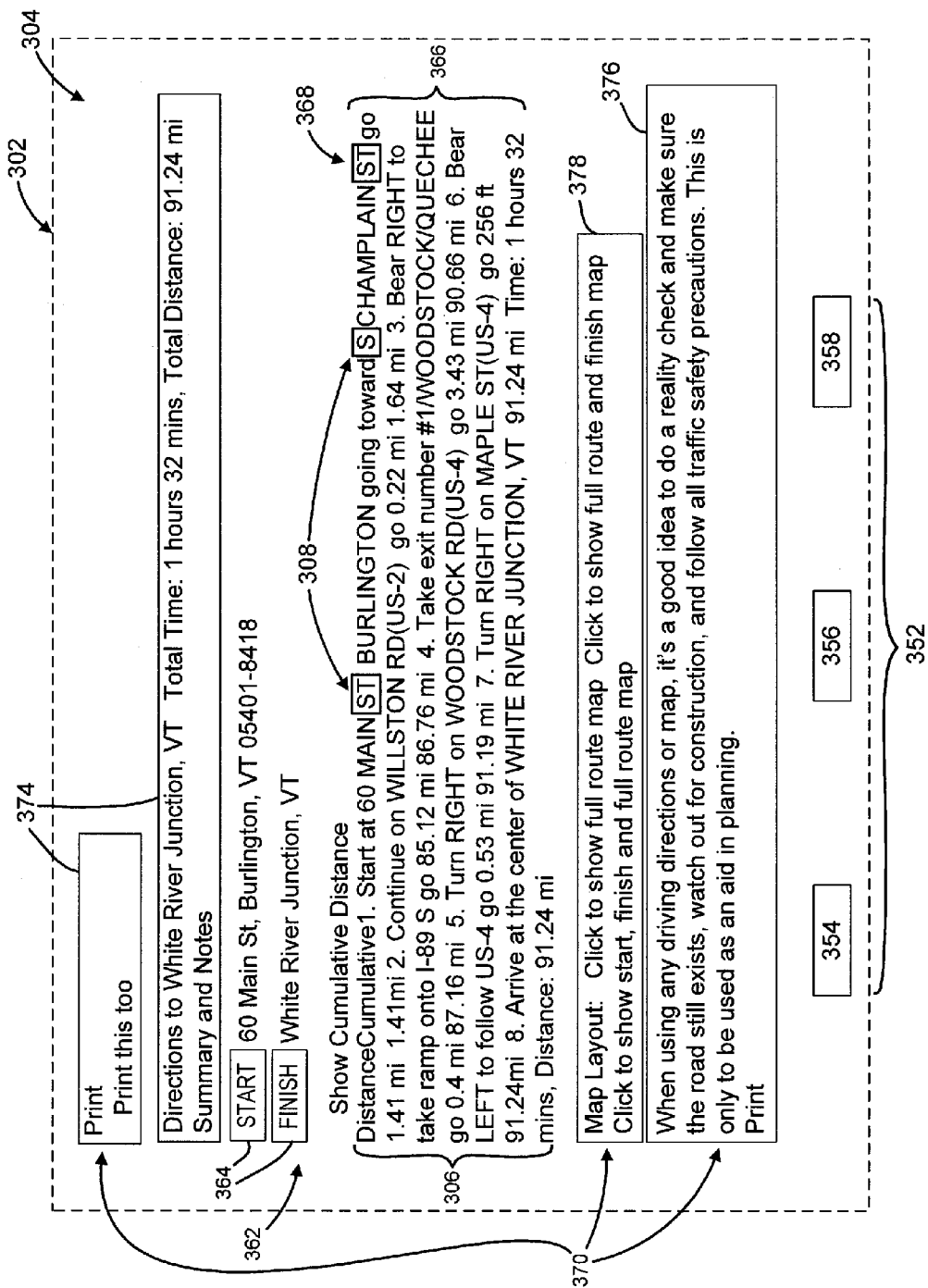
FIG. 4 is an illustration of the target of FIG. 3 in a text format for use with a contextual conversion platform such as the contextual conversion platform of FIG. 1.
Figure 5:
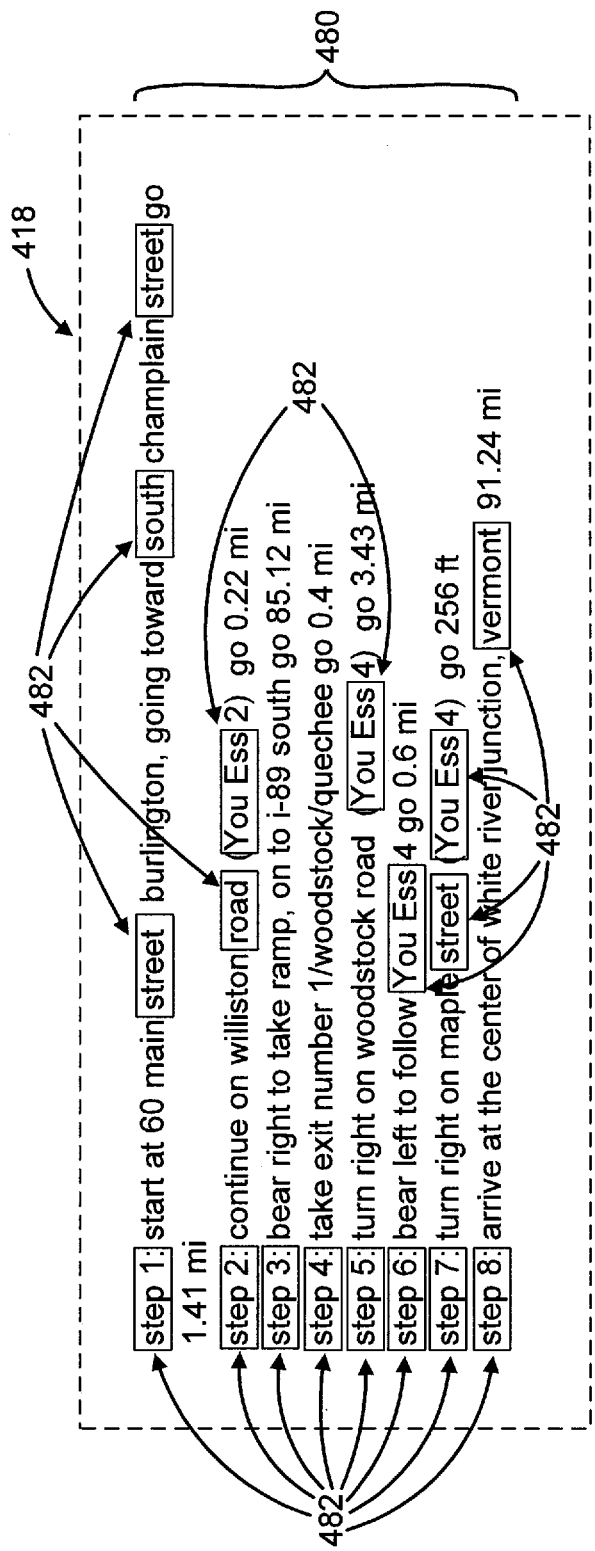
FIG. 5 is an illustration of a spoken content input generated by a contextual conversion platform such as the contextual conversion platform of FIG. 1.

Referring now to FIGS. 3-5, there is depicted examples of a target as such target would be presented to the user (e.g., target 202 (FIG. 3)), and as it would appear in its text-only based form (e.g., target 302 (FIG. 4)). There is also depicted in FIG. 5 an example of a spoken content input 418, which the embodiments of the contextual conversion platform 100 (FIG. 1) can generate by converting targets, e.g., targets 202 and/or 302, to the spoken content input. As depicted in FIG. 3, the target 202 can have content 204 that includes a plurality of contextual units 206 that each includes target terms 208.

More particular to the present example, there is shown in FIG. 3 that the content 204 can also include relevant contextual units 266 constructed of relevant target terms 268, the combination of which can make up the information for conversion into the spoken content input (e.g., spoken content input 118). The content 204 can also include miscellaneous content 270 such as symbolic content 272, header content 274, footer content 276, and map content 278. The miscellaneous content 270 is generally not converted to spoken content output for reasons of practical usefulness.

In FIG. 4, the target 202 of FIG. 3 is shown in text-only based form, such as the text-based form utilized by the processing module (e.g., the processing module 114) of the present disclosure. Like numerals are used to identify like components as between the target 202 of FIG. 3 and the target 302 of FIG. 4. For example, the target 302 can include content 304 with a plurality of contextual units 306 having target terms 308. The target 302 also includes content identifiers 352 such as a primary content identifier 354, a secondary content identifier 356, and a tertiary content identifier 358. The target 302 also includes filtering identifiers 362 such as the filtering units 364 embodied by the text "START" and "FINISH." While the content identifiers 352 are illustrated in particular portions of the content 304, they can also appear anywhere within the content 104. It is contemplated that platforms such as the platform 100 can be configured to locate the content identifiers 352 such as in accordance with patterns, positions, locations, and other common features of the identifier as they relate to the content 104. While this location can be done manually, embodiments of the platform 100 may be configured so as to provide automated analysis and processing of the content 104 and/or target 102 so as to provide the content identifiers 352.

In FIG. 5, the spoken content input 418 is also shown in a format such as a text form that is suited for conversion by a text-to-speech engine. The spoken content input 418 is the result of processing targets such as processing of the target 202 (FIG. 3) and the target 302 (FIG. 4) using embodiments of the contextual conversion platform 100. The spoken content input 418 includes a plurality of contextual units 480, which may correspond to one or more of the contextual units 106 (FIG. 1), 206 (FIG. 3), and 306 (FIG. 4). In the present example, each of the contextual units 480 recite driving direction corresponding to those driving directions in the target 202 (FIG. 3), and more particularly each have inserted therein one or more replacement elements 482. The replacement elements 482 can be selected and inserted in accordance with the discussion and description of the systems, methods, and implementations described herein. In one embodiment, the replacement elements 482 correspond to the replacement units 146 (FIG. 2) discussed above, and found in for example the Tables 1-3 above.

With continued reference to the examples of FIGS. 3 and 4, as well as to FIGS. 1 and 2 above, a discussion of the implementation of one embodiment of the contextual conversion platform 100 is provided immediately below. At a high level, a user may access a target such as the driving directions illustrated by the target 202 of FIG. 3. The user may wish to convert the driving directions to spoken output such as by having the driving directions converted, using a text-to-speech engine, to one or more audio files. This conversion may be initiated by, e.g., pointing and clicking an icon, a button, or by using a spoken command via automatic speech recognition (ASR) modules incorporated in or in communication with the platform 100. Initiation of the conversion may activate the processing module, which captures, receives, or otherwise operatively obtains the text-based form of the driving direction, illustrated by way of example by the target 302 of FIG. 4. The processing module can process the text-based form to generate the spoken content input (such as the spoken content input 418 (FIG. 5) above), examples of such processing being discussed in connection with FIGS. 5 and 6 below.

Figure 6:
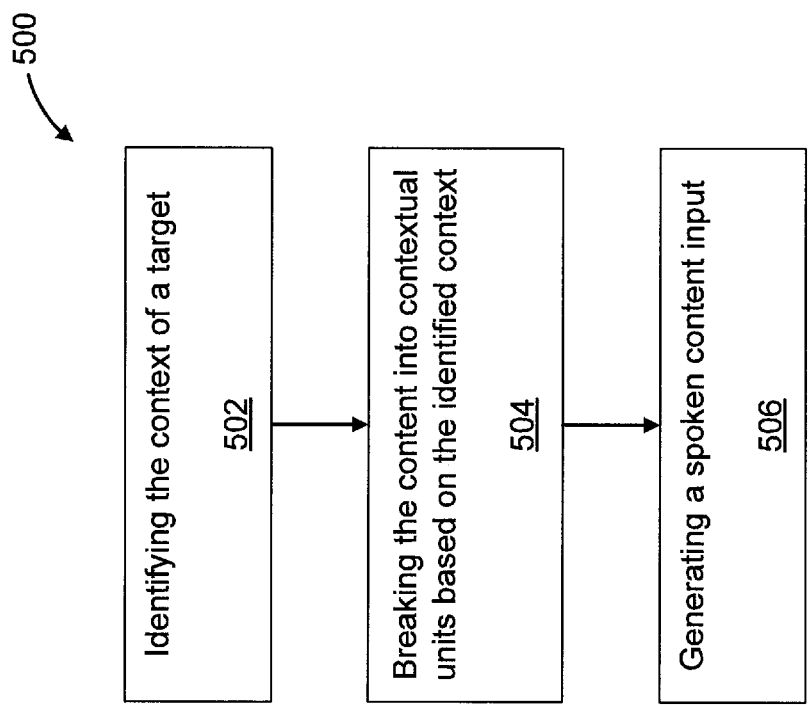
FIG. 6 is a flow diagram of an embodiment of a method for converting text to spoken content.

Turning now to FIG. 6, and with continued reference to the exemplary targets 202 (FIG. 3) and 302 (FIG. 4) (collectively, "the target"), and to the spoken content input 418 (FIG. 5), there is provided an exemplary embodiment of a method 400 for converting the content of the target to the spoken content input (e.g., the spoken content input 418) for use by the text-to-speech engine. The method 400 can be implemented using embodiments of the contextual conversion platform 100 (FIG. 1) such as by providing one or more executable instructions for implementing the various blocks 502-506 illustrated in FIG. 6. In the present example, the method 500 can include, at block 502, identifying the context of the target, at block 504, breaking the content into contextual units based on the identified context, and at block 506, generating a spoken content input based on the identified context and the contextual units. This spoken content input can be utilized by a text-to-speech engine to generate a spoken output, as discussed above.

Context identification such as can occur at block 502 can use certain pieces from among the content to recognize particular aspects of the target. This selection process can examine the relevant contextual units 366, the miscellaneous content 370, as well as the content 304 in general to search for and to find cues, keys, and triggers (collectively, "context cues") which can identify characteristics including one or more of the type, scope, and content of the target. In one embodiment, one or more filters such as the context filter 126 (FIG. 1) can be applied to locate and/or identify the context cues. In another embodiment, some of these context cues may be identified by way of the content identifiers 348 stored in and retrieved from the context repositories 130. Exemplary context cues can include URLs, titles, headlines, trademarks, symbols, prompts, keywords, and other features of the content that can identify the target.

The identified context can be used such as at block 504 to selectively break the content into one or more contextual units (e.g., contextual units 306). In one embodiment, one or more filters such as the content filter 128 (FIG. 1) can be applied to delineate and/or distinguish the various contextual units. The proper locations for breaks can also be identified by way of the filtering units 364 or other unit of the content that can be associated with the location, position, orientation, or other operative characteristic that can be used to identify the contextual units contemplated herein. In one example, contextual units can be steps, sentences, menu items, and prompts (such as input fields), the delineation of which being determined by the context.

The contextual units can be used to form the spoken content input (e.g., the spoken content input 418). In one embodiment, the contextual units of the target can be further processed to ensure that the resulting spoken content input contains the correct pronunciations, intonations, pauses, speed, pitch, attention marks/signals (e.g., bell, ding, and similar announcement sounds) as well as other characteristics common to the spoken language executed by the text-to-speech engine. This processing can be done for each of the identified contextual units and can include inserting, replacing, or otherwise substituting one or more replacement units (e.g., regular expressions and tokens) for target terms in the contextual units. The resulting spoken content input can thereafter be made available for, e.g., the speech generating module 120 (FIG. 1), so that the spoken output can be generated in accordance with the concepts disclosed herein.

Figure 7:
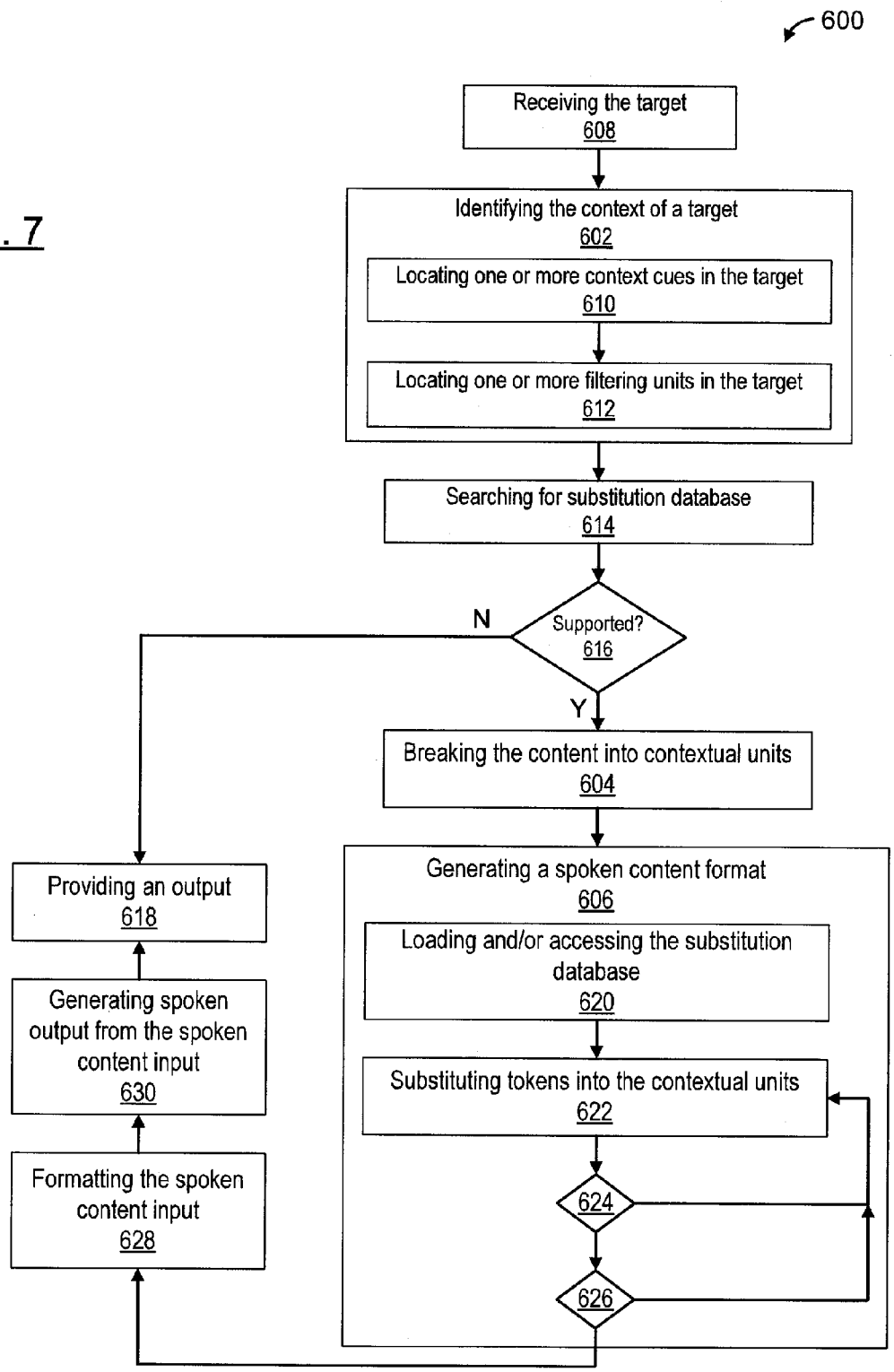
FIG. 7 is a is a flow diagram of another embodiment of a method for converting text to spoken content.

Referring now to FIG. 7, another exemplary embodiment of a method 600 for converting text to spoken output is illustrated. Like numerals are used to identify like blocks as between the method 500 of FIG. 6 and the method 600, except that the numerals are increased by 100 (e.g., 500 is now 600 in FIG. 7). For example, the method 600 can include at block 602, identifying the context of the target, at block 604, breaking the content into contextual units based on the identified context, and at block 606, generating a spoken content input based on the contextual units.

In one embodiment, the method 600 can also include at block 608 receiving the target such as at the processing module 114 (FIG. 1), at block 610 locating one or more context cues in the target, and at block 612 locating one or more filtering units in the target. Each of the blocks 610-612 can be implemented in a manner that permits access and communication among and between the processing module 114 (FIG. 1) and the context repositories 130 (FIG. 1).

In connection with the discussion above, embodiments of the contextual conversion platform can be provided as executable instructions which can be executed as an application, plug-in, or other computer-based implementation. Execution of these instructions, e.g., by selecting an icon and/or clicking a button of the computing device and/or by voice activated command, can cause communication as between the contextual conversion platform and the target to permit information of and about the target to interact with portions of the contextual conversion platform. These instructions can access the cue determination repository 134 (FIG. 1) and the filtering repository 136 (FIG. 1). Executable instructions can likewise be utilized to implement the context filter 126 (FIG. 1) and the content filter 128 (FIG. 1), thereby providing means to filter and identify particular information and data within the content of the target. This information can include, in one example, data associated with Web-based and Web-created documents such as Web-pages encountered using an interne browser compatible with the World Wide Web. These documents can be formatted in plain text (e.g., as illustrated in FIG. 4 above). Other documents can likewise be formatted using one of the many mark-up languages used to create Web-based content such as standard generalized markup language ("SGML"), hypertext markup language ("HTML"), extensible markup language ("XML"), speech synthesis markup language ("SSML"), and any derivations and combinations thereof.

In one embodiment, identification of the context cues can be performed using or in conjunction with a parser or similar component (employing executable instructions) for syntactic analysis of the content of the target. This identification can be done in one or more steps or passes through the content in which the contextual conversion platform is operatively configured to examine the data and content of the target to locate one or more hints, clues, or triggers that may identify characteristics of the target. Such characteristics may provide additional information for identification of the type, scope, field, and content of the target. As illustrated in FIGS. 3 and 4, in one embodiment the context cues may be found in or as part of the contextual units (e.g., contextual units 206, 306). In another embodiment, the context cues may be part of other areas of the content such as the miscellaneous content 270, 370.

The context cues can be manually assigned such by way of executable instructions that include particular context cues for distinguishing the field of the content of the target as between, e.g., driving direction and financial information. This assignment can likewise occur within or as part of look-up tables and repositories such as those found in the context repositories 130 (FIG. 1). These components can be accessed for purposes of searching out the context cues and other identifiers within the content of the target and identifying the format and characteristics of the target. Examples of these cues and identifiers are discussed above.

Referring back to FIG. 7, the method 600 can also include at block 614 searching for one or more substitution repositories based on the context of the target and at block 616 determining whether the target is supported. By way of example, and with reference to the discussion of FIG. 1 above, the repository module 116 in embodiments of the contextual conversion platform can include a variety of substitution repositories 132. These substitution repositories can be distinguished from one another by the type and/or format of the target supported by the particular substitution repositories 132. Driving directions may be supported, for example, by one or more substitution repositories 132. Each of these selected substitution repositories can be configured with substitution units 142 that can be assigned to the particular substitution repositories 132, which has substitution units 142 that are compatible with the particular format of the target. This compatibility can be based on the particular Web-pages on which the driving directions appear (e.g., as determined by the context cues and/or as found in the cue determination repository). Supported formats can include formats from, for example, Google, Yahoo!, MSN, and the like. In addition to these formats, it is further contemplated that embodiments of the contextual conversion platforms can also generate spoken content inputs for many other Web sites supported via one or more of the substitution repositories 132 discussed herein. These other Web sites formats can include generally most Web sites available via the World Wide Web, and more particularly, for example, social networking sites (e.g., Facebook and Twitter), newspaper sites (e.g., the NY Times and the Wall Street Journal), blogs, online magazines, online shopping sites, among many, many others.

If the target is not supported, e.g., there is no substitution repository available for the identified context of the target, then the method 600 can include at block 618 providing an output. In one embodiment, the contextual conversion platform can be configured to present to the user information or instructions that inform the user that the content of the target cannot be converted to spoken output. In another embodiment, the contextual conversion platform can feed/provide unprocessed text directly into text-to-speech engine which results in spoken output that is garbled or unintelligible. In yet another embodiment, the instructions can also request or automatically look for repository updates, e.g., by way of network access such as network 2500 (FIG. 1). Updates may be provided via a common source such as a common repository maintained on one or more servers external to the platform (e.g., local server 2000 and/or external server 3000). The updating of the repository module 116 can likewise occur via manual input or manual entry of data into the repository module 116 created by the user, by another application, and the like.

When support for the target is found in, e.g., the context repositories 130, the method 600 can include at block 620 loading and/or accessing one or more substitution repositories related to the format, and at block 622 substituting regular expressions and tokens from the substitution repositories into the contextual unit. In one embodiment, the method 600 can also include one or more of blocks 624 and 626 that permit continued analysis and examination of the content of the target, and in one particular example the blocks 624 and 626 can be used to ensure that all loaded substitution repositories are accessed to search for regular expressions and tokens to be substituted in the contextual units, and that all contextual units are provided with regular expressions and tokens where applicable to the target.

The blocks 620-626 can be used to build the spoken content input (provided to the text-to-speech engine), which can be provided for purposes of generating the spoken output. Executable instructions can be provided that embody the iterative processing of the content of the target. These instructions can be used to ensure that the spoken content input includes all of the correct pronunciations of the text units in the contextual units.

The spoken content input can be further processed in embodiments of the method 600, wherein the method 600 can include at block 628 formatting the spoken content input and at block 630 converting the spoken content input to spoken output. The additional formatting can be implemented to address issues of clarity that may arise when the spoken content input is converted to the spoken content. This formatting can take many forms such as, but not limited to, injecting pauses and breaks within the spoken content input and/or controlling speed and pitch of the spoken content. By way of example, the additional formatting can be selected to adapt the spoken content input to different text-to-speech engine, thereby influencing the spoken output. Moreover, conversion of the spoken content input to spoken content can utilize any text-to-speech engine.

Figure 8:
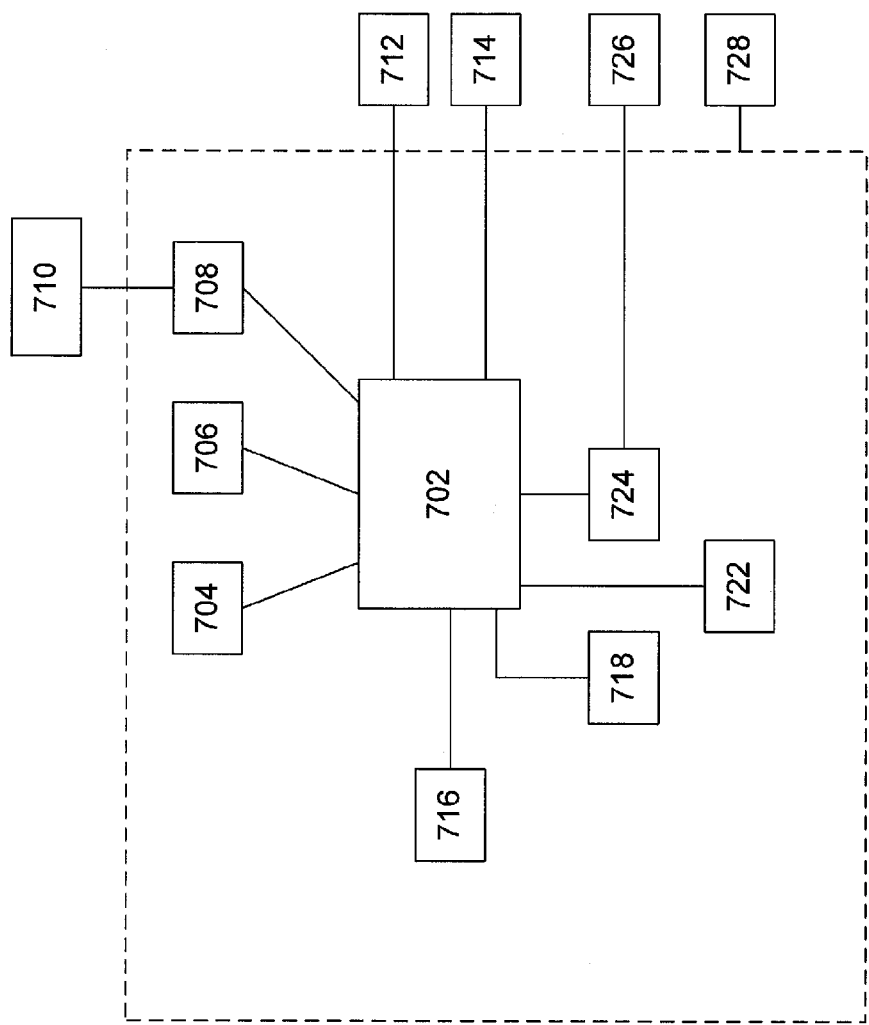
FIG. 8 is a schematic diagram of a computing device for use with a contextual conversion platform such as the contextual conversion platform of FIG. 1.

As mentioned above, embodiments of the contextual conversion platform can be implemented on systems constituted by a plurality of devices (e.g., host computer, interface, reader, and printer) or to a single device. By way of example, and with reference to the functional schematic drawing of FIG. 8, there is provided one example of a computing device 700 for use in connection with the contextual conversion platform of the present disclosure. In FIG. 8, reference numeral 700 designates personal computing equipment such as an IBM PC or PC-compatible computer, laptop, PDA, smartphone or other device compatible with the concepts disclosed herein. Computing equipment 700 includes a CPU 702 such as a microprocessor or related device that executes stored program instructions such as operator-selected applications programs that are stored in ROM 704 or specialized functions such as start-up programs which are stored in RAM 706. Computing equipment 700 further includes a local area network interface device 708 which provides access to a local area network 710 whereby the computing equipment can access files on a remote file server or send files for remote printing or otherwise interact with a local area network in accordance with known techniques such as by sending or receiving electronic mail.

Computing equipment 700 can further include a monitor 712 for displaying graphic images and a keyboard/mouse 714 for allowing operator designation and inputting functions. Neither of the monitor 712 or the keyboard/mouse 714 are necessary for implementations of platforms like platform 100, wherein voice activated commands and related equipment can be utilized. Moreover, other examples of computing equipment 700 can include other mechanisms for interfacing with the equipment 700, wherein such mechanisms can include touchscreens, touchpads, and the like.

Mass storage memory 716 is connected for access by CPU 702. Mass storage memory 716 typically includes stored program instructions sequences such as an instruction sequence for text parsing according to the present disclosure, or other application programs such as word processing application programs, optical character recognition programs, spread sheet application programs, and other information and data processing programs. Mass storage memory 716 can also store repositories including contextual repositories and related reference tables for use in connection with concepts of present disclosure, as well as arbitrary files which include text that are to be processed by text-to-speech conversion, scripting files which control a text-to-speech narration process, image files which are inserted by the scripting files, digitized sound files which are inserted by the scripting files and MIDI files which are inserted by the scripting files. Other data may be stored on mass storage memory 716 as designated by the operator.

A modem 718 such as a wireless interface device, as well as a facsimile interface 720, and a voice telephone interface 722 can be provided so that CPU 702 can interface to with external devices including local server 2000 (FIG. 1) and external server 3000 (FIG. 1) via network 2500 (FIG. 1). Thus, CPU 702 can send and receive data, including sending via means other than means 710.

A text-to-speech converter 724 is connected to CPU 702. The text-to-speech converter 724 interprets data such as the spoken content input sent to it and converts that spoken content input to audio speech information. The text-to-speech converter 724 provides the spoken content either to a speaker 726 for enunciation, or provides the spoken content in a file format such as .WAV, .MPEG, and .WMA to one or more of the ROM 704, RAM 706, network 710, mass storage 716, modem 718, and/or other another device that can thereafter make the spoken content accessible to the user. In one example, the spoken content can be uploaded to one or more of the external devices for storage and playback at a later time. In another example, the spoken content can be written to a computer readable medium such as a compact disk, removable data drive, and/or media player having components for storing the spoken content thereon. In addition, a microphone 728 or similar device can also be included as part of the computing equipment 700. In one example, such microphone can be used to provide alternative input to the mouse/keyboard, such as might occur in a hands free or related device.

Implementations of the concepts and aspects of the contextual conversion platforms disclosed herein are likewise useful to a variety of applications. These applications can include use as a voice printer driver, which operates in a manner that can "print" the content of, e.g., a Web page, as spoken content to one or more files, a medium such as a CD, USB drive, or other memory storage device. These applications can also include use as or in connection with a voice internet browser that can permit a user to interact with the World Wide Web exclusively via the spoken word. Examples of such applications can include a Web browser that is responsive to spoken commands, such as specific URL address. The voice internet browser could likewise interact with embodiments of the contextual conversion platform to generate spoken content output respecting the content of the URL address. This spoken content output could be provided to a text-to-speech engine, which is configured to provide the content of the URL in spoken content. In addition, application can include an "ad-free" visual (non-voice) browser such as might be provided on a specialized application, interface, and/or software product.

In view of the foregoing, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may in whole or in part be generally referred to herein as a "circuit," "module" or "system," and "platform." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing, Computer program code for carrying out operations for aspects of the present disclosure may be written in any combination of one or more programming languages, including an object oriented programming language such as Java, Objective C, C++ or the like and conventional procedural programming languages, such as the "C" programming language or similar programming languages. The programming language can also be compiled or interpreted as recognized in the art. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer code may likewise be executed on a physical or virtual machine.

There is provided above some aspects of the present disclosure that are described with reference to flowchart illustrations and/or block diagrams of methods, apparatus (systems) and computer program products according to embodiments made in accordance with the concepts and implementations contemplated herein. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is further contemplated that numerical values, as well as other values that are recited herein are modified by the term "about," whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

Moreover, while the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A contextual conversion platform for implementation on a computing device configured to process content of a target for use with a text-to-speech engine, said contextual conversion platform comprising:
    a processing module for generating a spoken content input in response to the target, the processing module comprising,
        a first filter module for identifying a context identifier in the target, and
        a second filter module for delineating portions of the target comprising one or more target terms; and
    a repository in communication with the processing module, the repository having entries that are organized according to a prioritized scheme, the entries comprising a substitution unit with an identified unit respecting the target terms in the delineated portions and a replacement unit corresponding to the identified unit,
    wherein the prioritized scheme assigns a position for the identified unit amongst a plurality of tables in the repository,
    wherein the position amongst the tables is assigned based on a specificity characteristic that describes a relative inclusivity of the substitution unit as compared to other substitution units in the plurality of tables,
    wherein the position defines a level of priority for the identified unit,
    wherein the level of priority changes as between the tables, and
    wherein the processing module replaces the identified unit in the delineated portions with the replacement unit in accordance with the level of priority to form the spoken content input.

2. A contextual conversion platform according to claim 1 wherein the delineated portions correspond to one or more content identifiers associated with the content of the target.

3. A contextual conversion platform according to claim 1 wherein the context identifier is used to select the tables, and wherein the context identifier comprises Web-based content consisting essentially of a uniform resource locator (URL), a title, and text found in the Web-based content.

4. A contextual conversion platform according to claim 1 wherein the identified unit comprises one or more variants of the target terms.

5. A contextual conversion platform according to claim 4 wherein the variants comprise the target terms in combination with one or more neighboring characters located proximate the target terms in the content.

6. A contextual conversion platform according to claim 1 wherein the identified unit comprises one or more regular expressions respecting the target terms.

7. A contextual conversion platform according to claim 1 wherein the tables comprises a first table and a second table, and wherein the level of priority decreases from the first table to the second table.

8. A contextual conversion platform according to claim 1 further comprising a text-to-speech engine in communication with the processing module, the text-to-speech engine operatively configured to generate a spoken content from the spoken content input.

9. A computer-implemented method for converting content of a target for use with a text-to-speech engine, said method comprising:
    at a computer comprising a computer program to implement processing operations:
    receiving data that defines content of a Website;
    processing the data to,
        identify a context identifier from among the content;
        separate the content into relevant content and miscellaneous content;
        locate a target term in the relevant content;
        use the context identifier to identify a substitution unit for the target term; and
        generate a spoken content input that can be utilized by a text-to-speech generator to generate spoken content, the spoken content input comprising a replacement unit corresponding to the substitution unit,
    wherein the substitution unit is selected from a repository with entries that are arranged in tables in accordance with a prioritized scheme,
    wherein the prioritized scheme defines a position amongst the tables for the substitution unit,
    wherein the position in the tables is assigned based on a specificity characteristic that describes a relative inclusivity of the substitution unit as compared to other substitution units, and
    wherein the position defines a level of priority for the identified token.

10. A computer-implemented method according to claim 9 further comprising selecting the table corresponding to the context identifier, wherein the context identifier comprises Web-based content consisting essentially of a uniform resource locator (URL), a title, and text found in the Web-based content.

11. A computer-implemented method according to claim 9 further comprising:
    performing a first substitution pass and a second substitution pass, wherein the level of priority changes from the first substitution pass to the second substitution pass.

12. A computer-implemented method according to claim 11, wherein the specificity characteristic of the identified units in the first substitution pass is less inclusive than the specificity characteristic of the identified units in the second substitution pass.

13. A computer-implemented method according to claim 9 further comprising performing additional formatting of the spoken content input.

14. A computer-implemented method according to claim 9 further comprising generating spoken content from the spoken content input.

15. A computer-implemented method according to claim 9, wherein the tables are associated with the context identifier.

16. A computer-implemented method according to claim 9 wherein the entries comprise at least one variant of the target term.

17. A computer-implemented method according to claim 16 wherein the variant comprises the target term in combination with one or more neighboring characters located proximate the target term in the content.

18. A computer-implemented method according to claim 9, wherein the tables comprise at least one regular expression associated with at least one of the terms.

19. A computer-implemented method according to claim 9, wherein the tables comprise a first table and a second table, and wherein the level of priority decreases from the first table to the second table.

20. A computer-implemented method according to claim 9 wherein the content of the target is in a text-based form.

* * * * *